United States Patent
Bucher

[11] Patent Number: 6,041,474
[45] Date of Patent: Mar. 28, 2000

[54] HANDLE FOR A TROLLEY

[75] Inventor: Peter Bucher, Pfäffikon, Switzerland

[73] Assignee: Bucher Management AG, Gossau ZH, Switzerland

[21] Appl. No.: 08/399,434

[22] Filed: Mar. 7, 1995

[30] Foreign Application Priority Data

Mar. 17, 1994 [CH] Switzerland .......................... 0794/94

[51] Int. Cl.$^7$ .................................................. A47B 95/02
[52] U.S. Cl. .................................. 16/110 R; 16/DIG. 18; 220/755; 280/47.34; 280/79.2
[58] Field of Search .......................... 280/47.17, 47.34, 280/37, 79.2, 655, 655.1; D34/17, 23; 220/752, 754, 755, 759, 761; 16/110 R, 111 R, 124, DIG. 5, DIG. 18, DIG. 19

[56] References Cited

U.S. PATENT DOCUMENTS

| | | | |
|---|---|---|---|
| 605,745 | 6/1898 | Read | 220/755 |
| 821,648 | 5/1906 | Kopf | 16/110 R |
| 2,573,206 | 10/1951 | Lee et al. | 280/79.2 |
| 2,693,366 | 11/1954 | Randolph | 280/655.1 |
| 3,877,744 | 4/1975 | Miller | 296/22 |
| 3,998,476 | 12/1976 | Kazmark, Sr. | 280/655 |
| 5,146,065 | 9/1992 | Motoki | 219/386 |
| 5,184,835 | 2/1993 | Huang | 280/655.1 |
| 5,189,281 | 2/1993 | Wyatt et al. | 219/386 |
| 5,440,784 | 8/1995 | Huu et al. | 16/124 |
| 5,452,778 | 9/1995 | Wang | 280/655 |

FOREIGN PATENT DOCUMENTS

| | | | |
|---|---|---|---|
| 2061947 | 6/1972 | Germany | 16/110 R |
| 85240710 | 10/1985 | Germany . | |
| 88047199 | 5/1988 | Germany . | |
| WO9202160 | 2/1992 | Germany . | |
| 208602 | 11/1966 | Sweden | 280/79.2 |
| 289946 | 7/1953 | Switzerland | 280/79.2 |
| 683655 | 12/1952 | United Kingdom | 280/47 |
| 2158399A | 11/1985 | United Kingdom | 280/655 |

Primary Examiner—Daniel W. Howell
Attorney, Agent, or Firm—McAulay Nissen Goldberg Kiel & Hand, LLP

[57] ABSTRACT

The multifunctional handle (10) for a movable container, trolley or cart has two lateral, rounded head elements (11) fixed to the trolley (1) and a connecting bow (20) connecting the same having a flat, rounded cross-section (Q). The connecting bow rises in roof-shaped manner from the central area (B1) of the head elements and forms a hand-correct depression (16) towards the head element. This leads to an ergonomically particularly favourable handle for numerous hand positions (P1 to P7).

19 Claims, 6 Drawing Sheets

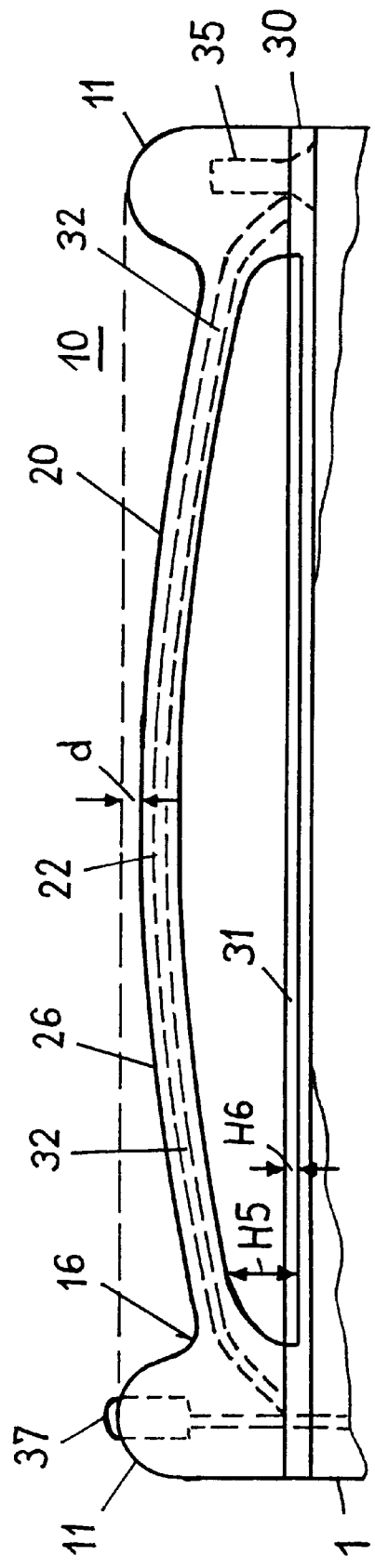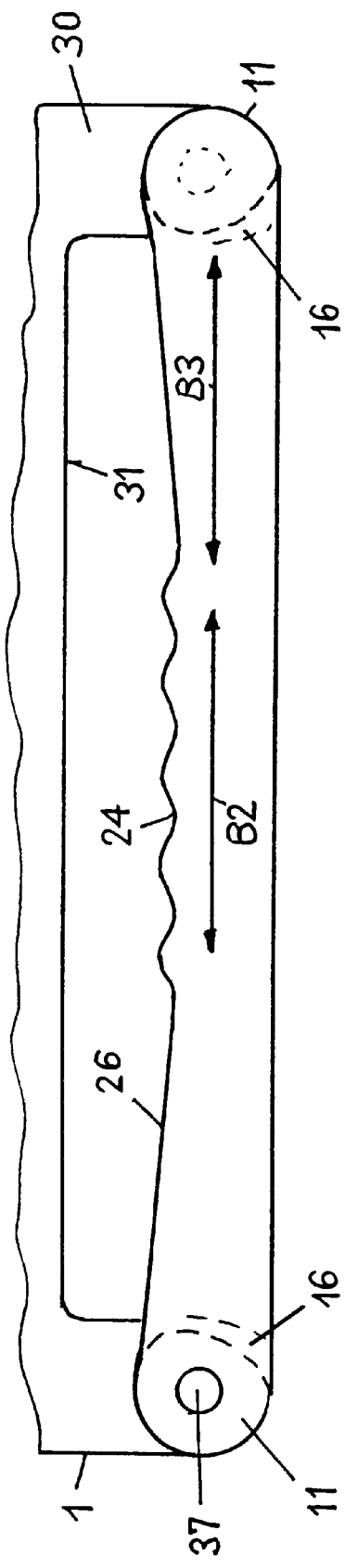

HANDLE FOR A TROLLEY

The invention relates to a handle for a movable container, particularly for a trolley in passenger aircraft, in the form of a semicircular member fixed at its two ends.

For handing out meals, drinks and other goods, more particularly in passenger aircraft, but also in trains, buses, ships and e.g. also in hospitals use is made of movable containers, known as trolleys or carts. When not in use they remain stowed and secured in the galley area, so that in the case of violent displacement or flight movements or also in the case of an accident or emergency landing they cannot be thrown around. In order to provide service the trolleys are moved by the cabin crew during flight through the narrow aisles in order to hand out the content thereof to the passengers. Modern trolleys have a considerable total weight of up to 90 kg and in exceptional cases up to 120 kg. The dimensions and useful volume are generally predetermined, because a maximum volume must be utilized for the contents in the case of extremely compact external dimensions and a relatively limited weight of the movable container of e.g. only 30 cm, which is due to the narrow aisles, particularly in aircraft, but also in trains and long-distance buses. This inter alia necessarily leads to small wheels, which have a high travelling resistance or a poor rolling resistance, particularly on carpeted floors. In the same way as for the wheels, there is scarcely any usable space available for fitting the handles for the manipulation of the trolleys.

The hitherto conventional, simple handles mainly comprising a straight rod not only cause considerable fatigue to the wrist, but also limit the safe handling of the heavy trolley. The unfavourable position of the hands with bent joints leads to overstressing, which can lead to health hazards. The handling of the trolley in the case of a turbulent flight or during ascent and descent if pushing is required against the gradient of the floor, is extremely tiring and far from easy to control. Under unfavourable conditions the hitherto used, simple handles can even constitute an injury risk. It must be borne in mind that product liability in certain circumstances can lead to considerable consequential costs for the trolley manufacturer, e.g. if health problems occur with the wrists.

It is therefore the problem of the present invention to overcome the inadequacies of the hitherto known handles or grips and bring about a significantly improved handling of the trolley under all operating conditions by correspondingly improved handles. The handling thereof is to be more universal, easier, safer and less fatiguing, whilst obviating health risks.

Briefly, the invention provides a handle for a moveable container, particularly for a trolley in a passenger aircraft. The handle is in the form of a semi-circular member which is fixed at two ends to the moveable container. In particular, the handle has two lateral rounded head elements which are fixed to the moveable container as well as a connecting bow which connects the two head elements. The bow is provided with a rounded cross-section and emanates from the central area of each head element. The connecting bow also rises in a roof-shaped manner to the central plane of the moveable container.

In accordance with the invention, the head elements have a flattened flank facing the connecting bow so as to form a hand-correct depression.

The combination of the features of the handle with respect to the arrangement and shaping of the head elements and connecting bow permits an optimum ergonomic handling of the trolley with several possible holding positions for the hands for pulling, pushing, steering, maneuvering and lifting the trolley. The holding positions of the hands are as natural as possible with only sight wrist bending and are consequently only slightly fatiguing. There is also a greater safety in handling with respect to the trolley operator. The handle permits an optimum handling in the galley area, in an aircraft cabin and on the ground, particularly under very restricted space conditions. The rounded, functional construction of the handle according to the invention also gives a pleasing physical appearance. The handle is robust against impacts, wear and with respect to static loading, so that the trolley can also be safely stopped, i.e. by bearing on the handles.

The handle also has improved characteristics concerning efficiency, handling, ergonomics and safety.

The invention is described in greater detail hereinafter relative to non-limitative embodiments and the attached drawings, FIG. 1 diagrammatically illustrates the construction of a handle according to the invention;

FIG. 3a illustrates a front view of a modified handle constructed in accordance with the invention on a moveable container;

FIG. 3b illustrates a top view of the handle of FIG. 3a;

FIG. 6b illustrates a plan view of the handle of FIG. 6a;

Figure 1:
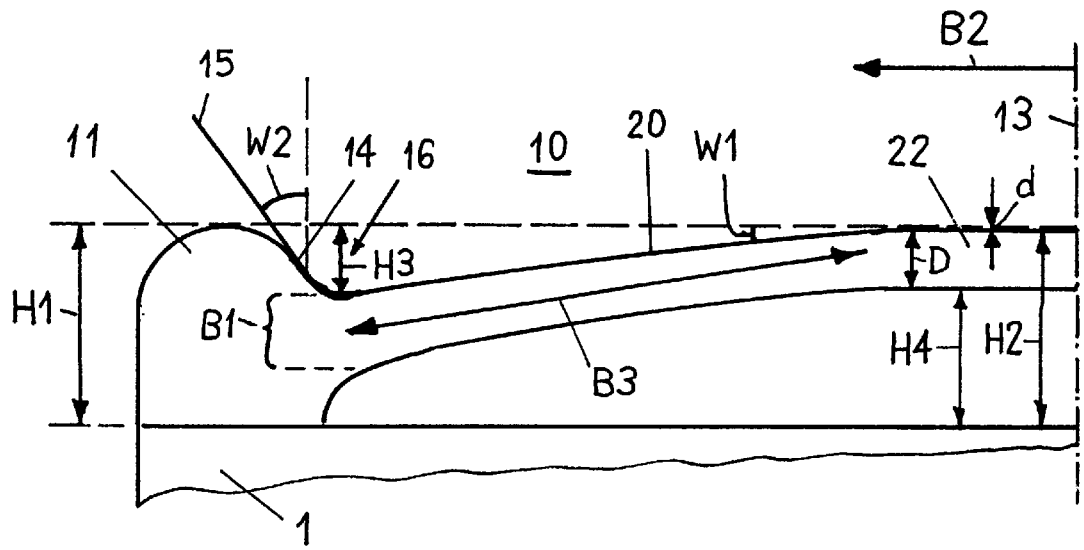
Figure 2C:
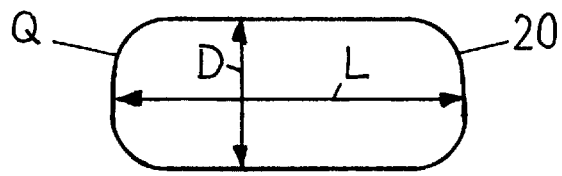
FIG. 2c illustrates a cross-sectional view of the bow of the handle.
Figure 5A:
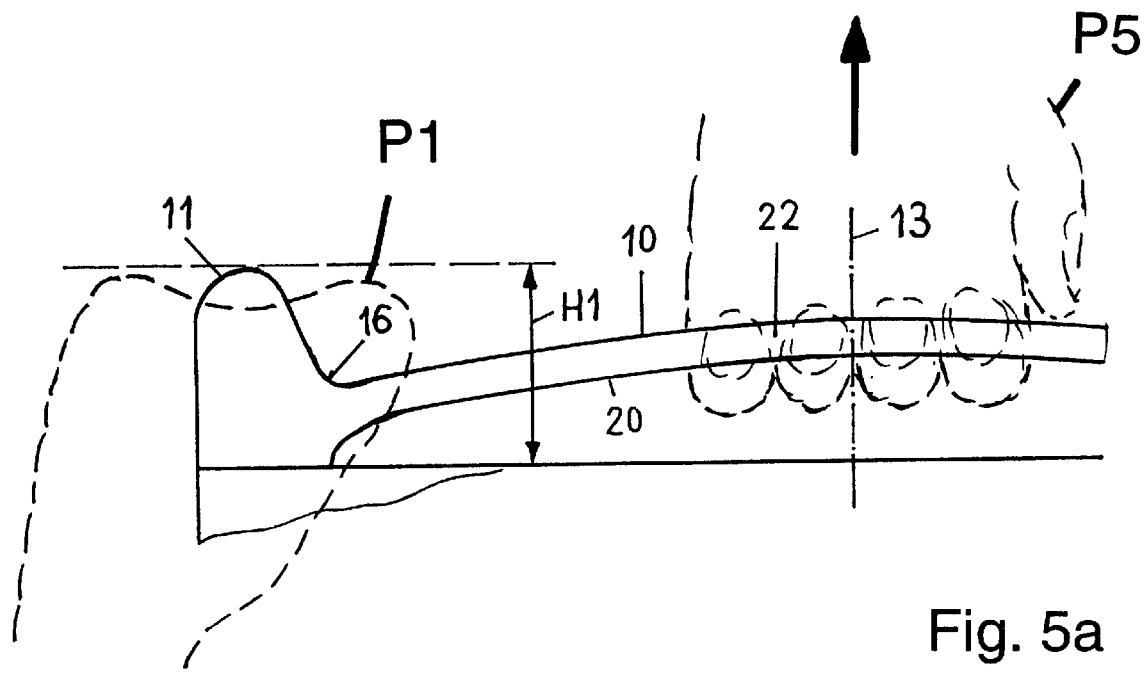
FIG. 5a illustrates a front view of a handle similar to FIG. 1 being gripped for lifting purposes.
Figure 5B:
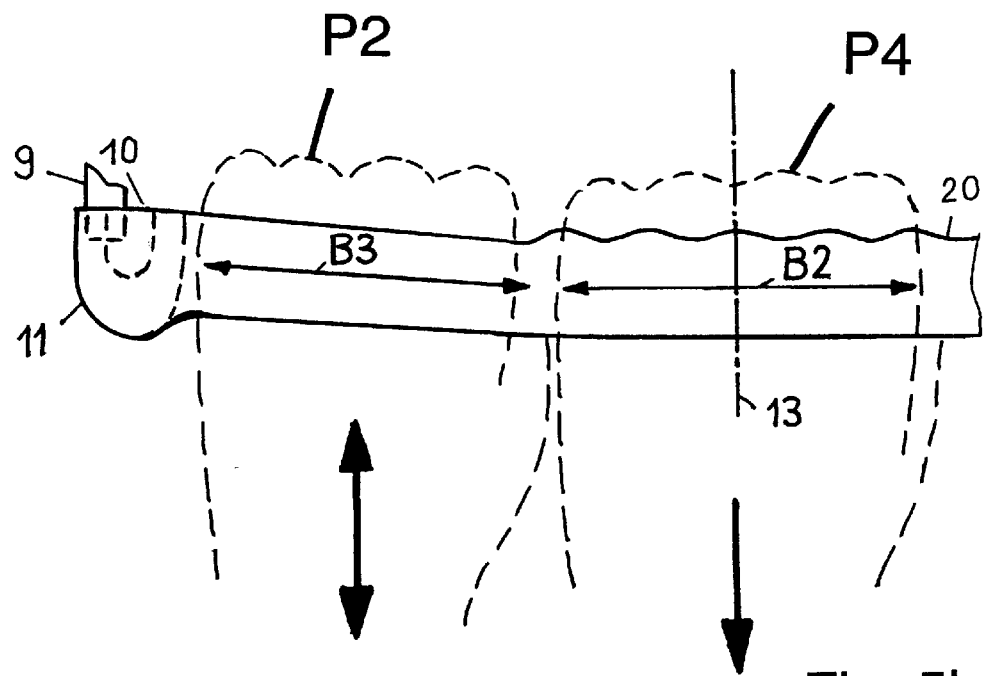
FIG. 5b illustrates a plan view of a handle being gripped for pushing and/or pulling.

The handle or grip 10 according to the invention shown in FIGS. 1 and 2 has two lateral, rounded head elements 11 fixed to the trolley 1 or to its cover plate 30. These head elements are connected by a connecting bow 20 rising in roof-like manner in the area B3 from the central area B1 of the head elements on both sides to the median plane 13 of the trolley and there in a horizontal, central area B2 forms a central grip 22 with shaped finger depressions 24. The head elements 11 have a flattened flank 14 with a tangent 15 on the latter, which forms an acute angle W2 to the vertical of preferably 25 to 40°. The side grip area B3 of the connecting bow 20 has a slope W1 of preferably 6 to 15°. As a result of this construction of the handle 10 several advantages are simultaneously obtained. In the case of the requisite limited overall height H1 a stable handle is formed, which permits several handling positions under optimum ergonomic conditions. As a result of the central attachment of the bow 20 in the area 1 firstly a hand-correct depression 16 is formed for two different hand positions P1 and P3 (according to FIG. 5a, 6b and 7), whilst simultaneously the side grip area B3 for the hand positions P2 (FIG. 5b) and P3 rising with the angle W1 permits optimum, natural hand holds and the arc 30 in the highest area B2 with a correspondingly larger free height H4 creates adequate space for the hand positions P4 and P5 (FIG. 5a, 5b). The depression 16 has a depth H3 of preferably 10 to 20 mm. The height H5 close to the head 11 has intentionally been made relatively small, so that here adequate space is provided for the small finger in the holding positions P2 and P3, whilst there is not adequate space here for the thumb, so that instead of this only the position P1 (according to FIG. 5a) can be assumed, in which the thumb rests in the depression 16 and can therefore not remain under the bow 20 at location H5, so that a significant risk of injury for the thumb in the case of strong impacts is avoided. The bow 20 also has a rounded, flat cross-section Q (FIG. 2c), which as a result of its length L gives a good strength and stability, but as a result of its smaller thickness D of e.g. 10 to 12 mm does not take up too much space of the limited height H11. The ratio of the length L to the thickness D is advantageously between 2 and 4.

Figure 4A:
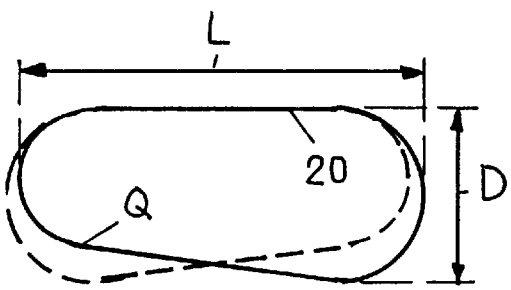
FIG. 4a illustrates a modified cross-sectional view of a bow in accordance with the invention.
Figure 4B:
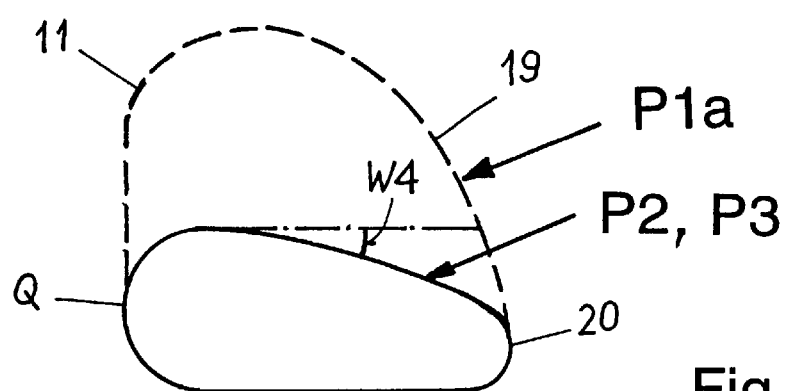
FIG. 4b illustrates a cross-sectional view of a further modified bow in accordance with the invention.
Figure 6A:
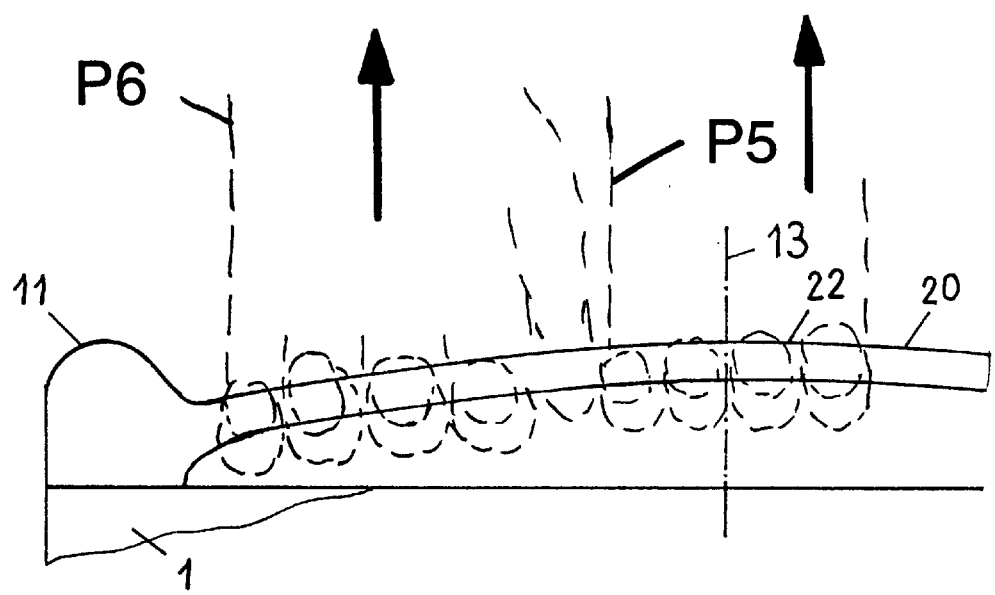
FIG. 6a illustrates a view similar to FIG. 1 of a handle being pulled with two hands.
Figure 6B:
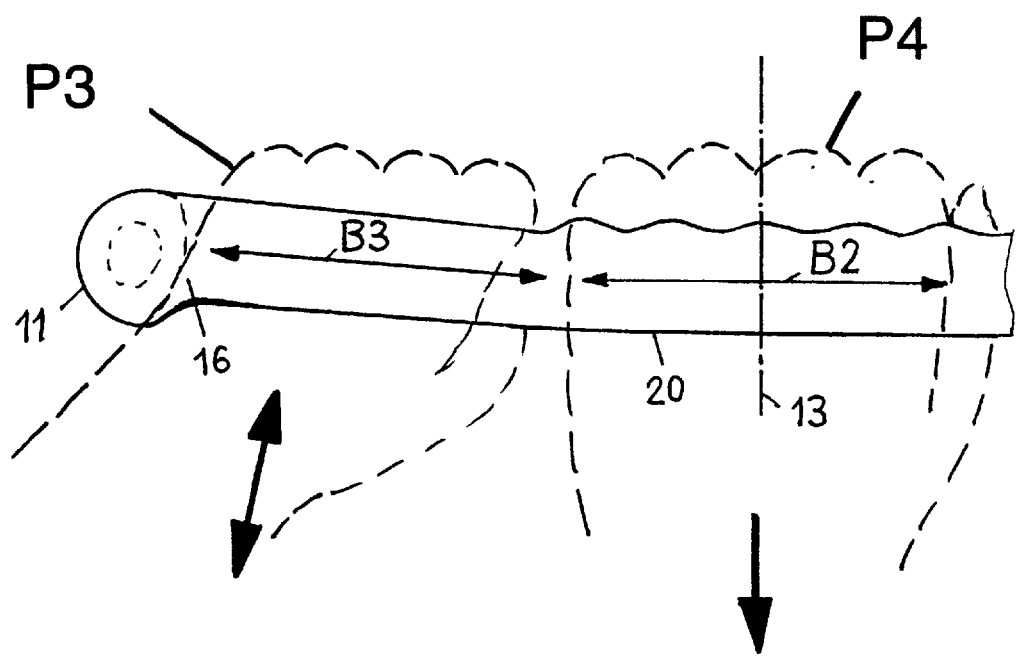
Figure 7:
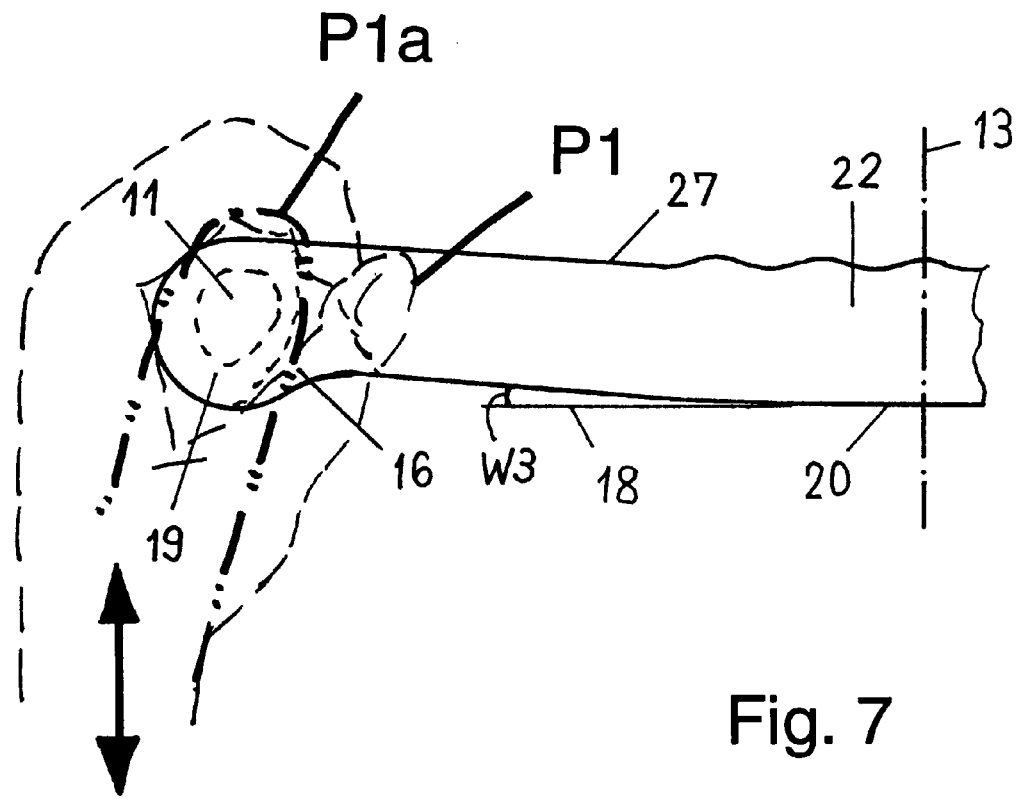
FIG. 7 illustrates a plan view of a modified handle in accordance with the invention.

Apart from the simple, uniformly rounded shape according to the embodiment of FIG. 2c, the cross-section Q can also be asymmetrically rounded according to FIGS. 4a, b, so as to be ergonomically adapted to the hand positions. In the case of FIG. 4b the upper surface is inclined by an angle W4 of e.g. 10 to 20°, so that for the hand position P2, P3 the hands engaging in a manner sloping from above can be supported in an optimum manner. FIG. 4b also shows a side view of an asymmetrically rounded head element 11. Instead of being supported in the depression 16 in position P1, if desired, the thumb here can also be supported on the well-rounded front flank 19 of the head 11 according to position P1a (FIG. 7). As a function of the area (B2, B3, B4) the shaping of the cross-section Q can be different and adapted in optimum manner to the corresponding, desired hand positions, e.g. in the area of H5 in such a way that the thumb assumes the position of P1, as explained hereinbefore. FIGS. 2, 3 and 5 to 8 show variants of differently rounded head elements 11 and different bow shapes 26, 27, 28.

In order to utilize the full height H1 and therefore always ensure trolley stability, the maximum height H2 of the connecting bow 20 is no greater than the height H1 of the head elements. The difference d=H1−H2 is preferably between 0 and 6 mm.

A slight arrow-shaped bending by an angle W3 of preferably 5 to 15° to the transverse axis 18 leads to a further ergonomic improvement for the hand holding positions P2, P3 in area B3. That is to say, the bow 20 has a pair of lateral portions, each of which extends between a central portion of the bow 20 to a respective head element 11 with a front face (see FIG. 2b) defining an angle of from 5° to 15° relative to a vertical plane extending transversely to the head elements.

On both longitudinal ends of a trolley 1 is in each case advantageously fitted a handle 10 according to the invention, whose heads are then connected or assembled on either side with in each case one longitudinal rod 9 (FIGS. 2a, b) so as to give an all-round handle arrangement.

Figure 2A:
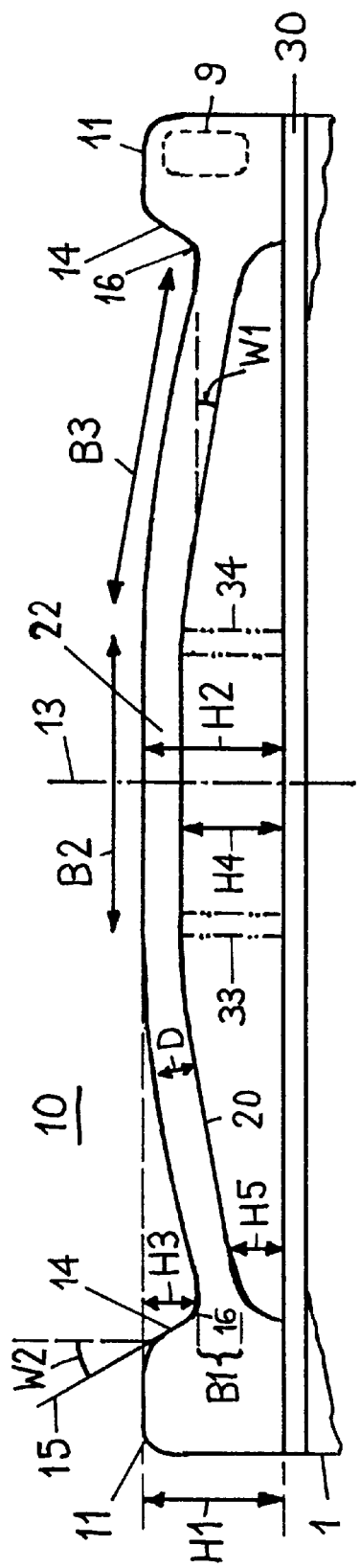
FIG. 2a illustrates a side view of the handle of FIG. 1.
Figure 2B:
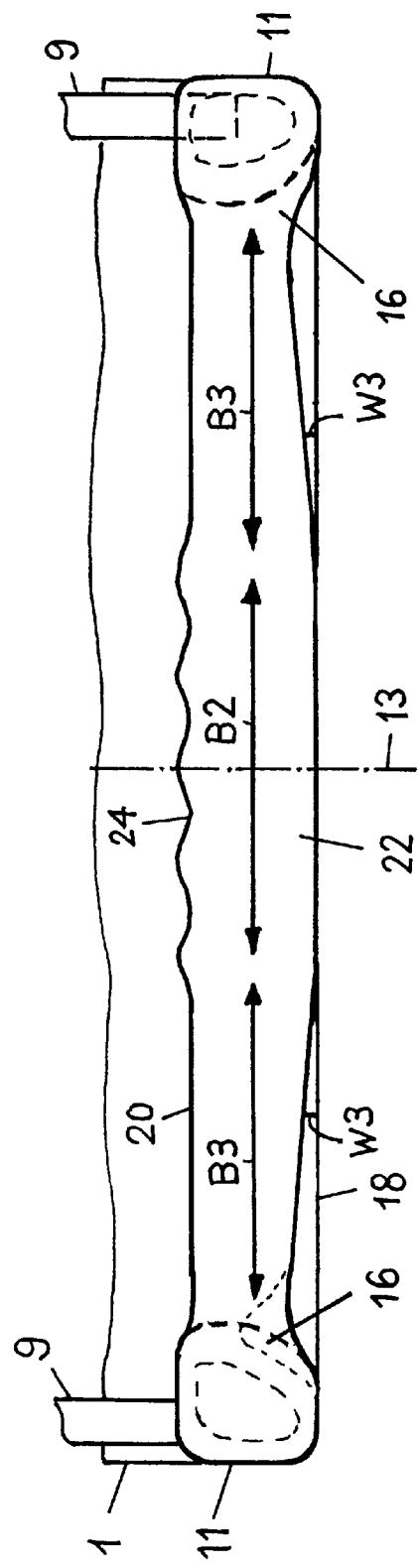
FIG. 2b illustrates a top view of the handle of FIG. 1.

If the handle is to be exposed to particularly high forces acting on its central part B2, then additional supports 33, 34 according to FIG. 2a can be used there on one or both sides and connect the central area 22 to the cover plate 30. A particularly rational manufacture of a light and stable connecting bow 20 can e.g. be obtained by injection moulding from short fibre-reinforced plastic. It is also possible to insert a reinforcing core 32 made from long fibre material or a light metal curved member, around which injection moulding takes place, as shown in FIG. 3a. The reinforcing core 32 can e.g. comprise a glass, carbon or aramide-thermoplastic composite, which is injection moulded round e.g. with glass fibre-reinforced polyamide. Further advantageous manufacturing methods are pressure die-casting or forging of light metals, such as aluminium alloys. The handle 20 is to be connected e.g. by means of a screw 35 on both sides and so as to be easily dismantlable with respect to the cover plate 30.

FIG. 3a, b shows another embodiment 26 with uniformly curved connecting bow 20. For further reducing the overall height H1 of the head elements 11 in this case in the cover plate 30 is formed a recess or depression 31 with a depth H6 of e.g. 4 to 8 mm, which creates below the bow 20 additional space for the hand positions P2 to P7. That is to say, the bow 20 bridges over the recess 31.

As required, in the multifunctional handle according to the invention it is even possible to integrate additional operating functions, e.g. in the form of a brake release button 37 at the top on a head element 11, as shown in FIG. 3a. The handle 10 permits the following, ergonomically favourable hand positions P1 to P7 for the universal maneuvering of the trolley:

P1: Both hands laterally clasp the head element 11. In this case the depression 16 forms a supporting surface adapted to the thumb and supporting the latter (FIGS. 5a and 7). The rounded construction of the head 11 makes it possible to turn the hand gripping the same into the most favourable position, as a function of whether pushing takes place with arms extended or with angled elbows. The steering of the trolley is also facilitated by pulling one and pushing the other head element 11. This position P1 is more particularly suitable for vertical handling. When using a particularly deep depression 16 it is even possible to have a hand position P1, which does not extend over the height H1 of the head 11, e.g. with H3 approximately 25 mm and H1 approximately 45 mm.

Figure 8:
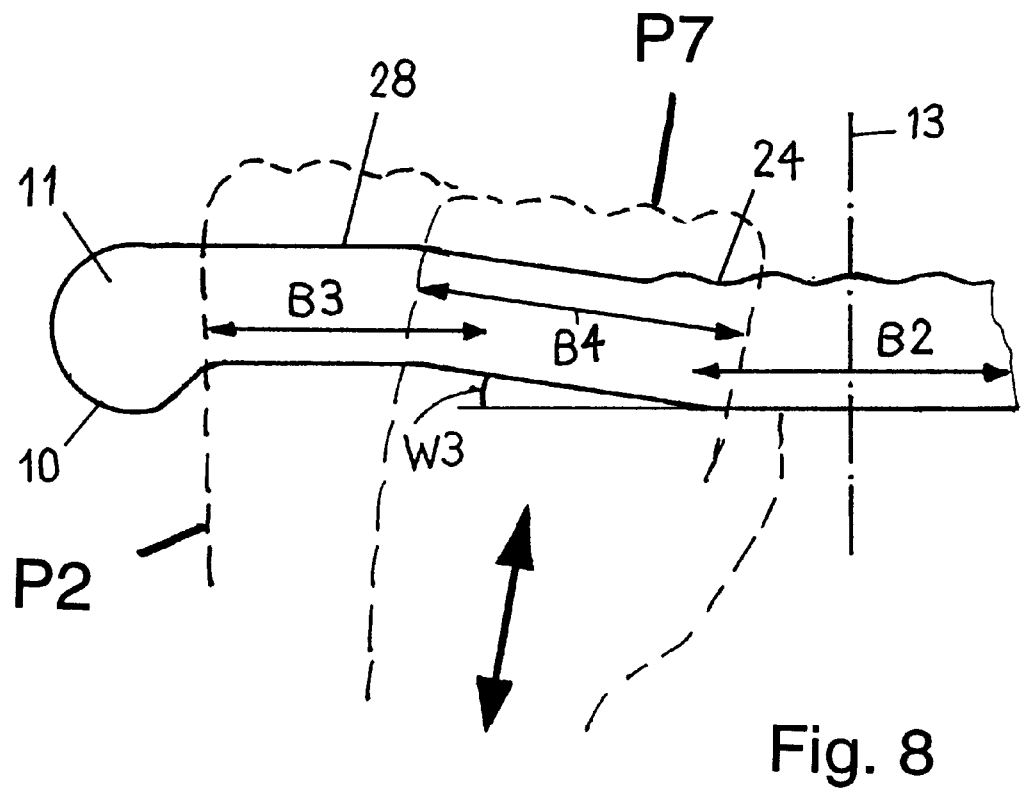
FIG. 8 illustrates a plan view of a modified handle having an offset shape in a horizontal plane in accordance with the invention.

P2: Both hands are applied laterally in the area B3 to the curved connecting bow 20 (FIGS. 5b, 8). As a result of the slight upward slope with the angle W1 the hands rest naturally and therefore in fatigue-free manner in the horizontal position. This position is suitable for both pulling and pushing with arms extended.

P3: When pushing with bent arms the wrists are turned outwards in the area B3 (FIG. 6b). In this position the outer balls of the thumbs have an optimum adapted supporting surface in the depression 16 on the heads 11. Thus, the depression 16 forms an optimum supporting surface for the two hand positions P1 and P3.

P4: Pulling the trolley with one hand on the central grip 22 in the area B2 (FIG. 5b). The four finger depressions 24 provide an optimum centring of the hand position in automatically feelable manner, without even looking.

P5: At the same location B2, gripping with one hand, it is possible to easily lift the trolley (FIG. 5a).

P6: On both sides in area B3 lifting the trolley with both hands (FIG. 6a).

P7: In a further example of FIG. 8 the connecting bow 20, viewed from above, has a shape 28 with three different areas B2, B3 and B4. The lateral area B3, emanating from the head 11, firstly passes in the direction of the transverse axis 18, is then bent round forwards in the area B4 with a larger angle of sweepback W3 of e.g. 10 to 15° and subsequently passes into the straight area B2. Thus, apart from the position P2 (here e.g. with arms extended) in area B3 a further hand position P7 is obtained in area B4 for pulling or pushing with bent arms. Therefore the area B4 overlaps on the edge the areas B3 and B2. In the outer finger depressions 24 the index fingers are in the position P7.

Another important advantage of the multifunctional handle according to the invention is that several hand positions P1 to P7 are possible and as a result of the changes there is less fatigue and cramp in the hands and also the grip positions can be simply and rapidly changed (e.g. P1–P2, P2–P3, P2–P7, P3–P4, etc.). The hands thereby almost automatically find the natural, safe positions. This in turn increases controllability and safe operation of the trolley, particularly under turbulent flight conditions and with high travelling resistance.

The handle arrangement according to the invention can be simply and inexpensively manufactured with few parts, is easy to assemble and also easy to repair.

I claim:

1. A handle for a trolley comprising a pair of rounded head elements, each said head element having an upwardly extending flattened flank on one side and being sized to form a grip for a hand; and a bow connected to and between said head elements, said bow having a rounded cross-section and extending from a central area of a respective head element adjacent said flattened flank thereof to form a hand-correct depression therewith, said bow extending from a respective head element in a roof-shaped manner to a central plane thereof to define a grip position between said head elements for at least two hands.

2. A handle as set forth in claim 1 wherein said bow has four finger-sized depressions in a horizontal central gripping area thereof.

3. A handle as set forth in claim 1 wherein said bow extends from each respective head element on an angle of from 6° to 15°.

4. A handle as set forth in claim 1 wherein said flattened flank of a respective head element forms an acute angle to a vertical plane of from 25° to 40°.

5. A handle as set forth in claim 1 wherein said bow has a pair of lateral portions, each lateral portion extending between a central portion of said bow to a respective head element with a front face defining an angle of from 5° to 15° relative to a vertical plane extending transversely to said head elements.

6. A handle as set forth in claim 1 wherein said depression has a depth of from 10 to 25 millimeters.

7. A handle as set forth in claim 1 wherein each head element has a predetermined height (H1) and said bow has a maximum height (H2) less than said predetermined height of up to 6 millimeters.

8. A handle as set forth in claim 1 wherein said bow has an asymmetrically rounded cross-section.

9. A handle as set forth in claim 8 wherein said cross-section of said bow has a length-to-thickness ratio of from 2 to 4.

10. A handle as set forth in claim 1 wherein said head elements and said bow are of one-piece construction and are made of an injection molded fiber reinforced plastic.

11. A handle as set forth in claim 10 further comprising a reinforcing core in said bow made of one of metal and a long fiber material.

12. A handle as set forth in claim 1 wherein said head elements and said bow are made of metal.

13. In combination, a trolley of narrow width having a plurality of wheels for rolling along a narrow aisle on a floor; and a handle secured to a top surface of said trolley in an upstanding manner, said handle including a pair of upstanding rounded head elements sized for selective manual gripping thereof and secured to said trolley at spaced apart points and a bow secured to and extending between said head elements, said bow extending from a central area of a respective head element to an elevated position in a central plane of said trolley.

14. The combination as set forth in claim 13 which further comprises a cover plate secured to and between said trolley and said handle, said cover plate having a recess therein with said bow bridging over said recess.

15. The combination as set forth in claim 13 wherein said bow has a rounded cross-section and extends in a roof-shaped manner to said central plane of said trolley to define a grip position at least two hands wide, each said head element having a flattened flank extending upwardly from adjacent said bow to form a hand-correct depression and each head element being sized to form a grip for a hand.

16. In combination, a moveable container having a plurality of wheels for rolling on a floor; and a handle secured to at least one end of a top surface of said container for moving said container, said handle being disposed transversely across said container and including a pair of head elements fixed to said container at spaced apart points and a bow connected to and between said head elements, said bow being of curvilinear shape in a vertical plane with each end thereof extending from a central area of a respective head element to form a finger-receiving depression therewith.

17. The combination as set forth in claim 16 wherein said container has a depression in a surface opposite a central area of said bow.

18. The combination as set forth in claim 16 wherein said bow has a plurality of finger-receiving depressions in a central gripping area thereof.

19. The combination as set forth in claim 16 wherein said head elements are vertically oriented.

* * * * *